US008620485B2

(12) United States Patent
Vander Hout et al.

(10) Patent No.: US 8,620,485 B2
(45) Date of Patent: Dec. 31, 2013

(54) ELECTRICAL TAGGING DEVICE

(75) Inventors: Jan Huibert Vander Hout, Cooma (AU); Mark Geoffrey Lynn, Cameron Park (AU); Geoffrey Scott Knagge, Berowra Heights (AU)

(73) Assignee: IntaCept Pty., Ltd., Cooma (AU)

( * ) Notice: Subject to any disclaimer, the term of this patent is extended or adjusted under 35 U.S.C. 154(b) by 373 days.

(21) Appl. No.: 12/672,783

(22) PCT Filed: Aug. 8, 2008

(86) PCT No.: PCT/AU2008/001156

§ 371 (c)(1),
(2), (4) Date: Feb. 9, 2010

(87) PCT Pub. No.: WO2009/021273

PCT Pub. Date: Feb. 19, 2009

(65) Prior Publication Data

US 2011/0153112 A1 Jun. 23, 2011

(30) Foreign Application Priority Data

Aug. 10, 2007 (AU) ................................ 2007904331

(51) Int. Cl.

| | |
|---|---|
| ***G05D 5/00*** | (2006.01) |
| ***G05B 9/02*** | (2006.01) |
| ***G05B 19/00*** | (2006.01) |
| ***G05B 23/00*** | (2006.01) |
| ***G06F 19/00*** | (2011.01) |
| ***G06F 11/30*** | (2006.01) |
| ***H04Q 5/22*** | (2006.01) |
| ***G06K 5/00*** | (2006.01) |

(52) U.S. Cl.
USPC ........ 700/297; 700/80; 700/108; 700/110.51; 340/5.3; 340/5.66; 340/10.41; 235/382; 702/184

(58) Field of Classification Search
USPC ........ 340/572.1, 572.4, 825.54, 825.06, 5.91, 340/825.35, 825.49, 5.2, 5.23, 5.66, 5.3, 340/5.54, 5.26, 5.61, 10.51, 10.41, 680, 340/5.5; 235/435, 382, 382.5, 385, 484, 235/492, 380, 383; 345/1, 2, 30, 43, 55; 700/108, 109, 111, 80
See application file for complete search history.

(56) References Cited

U.S. PATENT DOCUMENTS 5,384,765 A * 1/1995 Sakagami et al. ............ 340/458
5,537,126 A 7/1996 Kayser et al.

(Continued)

FOREIGN PATENT DOCUMENTS

CN 1744132 A 3/2006
CN 1858806 A 11/2006

(Continued)

OTHER PUBLICATIONS

Espacenet English Language Abstract for CN1744132 published Mar. 8, 2006.

(Continued)

*Primary Examiner* — Jennifer Mehmood
*Assistant Examiner* — Mirza Alam
(74) *Attorney, Agent, or Firm* — Tiajoloff and Kelly LLP

(57) ABSTRACT

An electronic tag (8) displays and monitors a maintenance state of an associated electrically-powered device. The tag includes data storage (2) for storing data indicative of the maintenance state, the data comprising information defining an expiry date for the maintenance state. A data processing unit (3) monitors a remaining duration to the expiry date and a display (4) displays information indicative of the maintenance state. A cut-out unit (7) controllably enables transmission of electrical power to the associated electrically powered device dependent on the remaining duration.

28 Claims, 16 Drawing Sheets

(56) References Cited

U.S. PATENT DOCUMENTS

| | | | | |
|---|---|---|---|---|
| 5,736,967 | A | 4/1998 | Kayser et al. | |
| 5,737,241 | A * | 4/1998 | Accolla et al. | 340/541 |
| 5,852,590 | A | 12/1998 | De La Huerga | |
| 5,883,576 | A | 3/1999 | De La Huerga | |
| 5,960,085 | A | 9/1999 | De La Huerga | |
| 6,032,155 | A | 2/2000 | De La Huerga | |
| 6,098,356 | A | 8/2000 | Sorkin | |
| 6,181,299 | B1 | 1/2001 | Frederick et al. | |
| 6,249,263 | B1 | 6/2001 | Kayser et al. | |
| 6,255,951 | B1 | 7/2001 | De La Huerga | |
| 6,259,654 | B1 | 7/2001 | De La Huerga | |
| 6,266,052 | B1 | 7/2001 | Kayser et al. | |
| 6,271,807 | B1 | 8/2001 | Kayser et al. | |
| 6,346,886 | B1 | 2/2002 | De La Huerga | |
| 6,408,330 | B1 | 6/2002 | De La Huerga | |
| 6,417,760 | B1 | 7/2002 | Mabuchi et al. | |
| 6,529,446 | B1 | 3/2003 | De La Huerga | |
| 6,552,663 | B2 * | 4/2003 | Swartzel et al. | 340/572.1 |
| 6,611,733 | B1 | 8/2003 | De La Huerga | |
| 6,779,024 | B2 | 8/2004 | De La Huerga | |
| 6,784,802 | B1 * | 8/2004 | Stanescu | 340/687 |
| 6,819,218 | B2 | 11/2004 | Mabuchi et al. | |
| 6,838,163 | B2 | 1/2005 | Smith et al. | |
| 6,859,757 | B2 | 2/2005 | Muehl et al. | |
| 7,006,894 | B2 | 2/2006 | De La Huerga | |
| 7,047,159 | B2 | 5/2006 | Muehl et al. | |
| 7,061,831 | B2 | 6/2006 | De La Huerga | |
| 7,216,802 | B1 | 5/2007 | De La Huerga | |
| 7,341,197 | B2 | 3/2008 | Muehl et al. | |
| 2001/0017817 | A1 | 8/2001 | De La Huerga | |
| 2001/0028308 | A1 | 10/2001 | De La Huerga | |
| 2001/0045893 | A1 | 11/2001 | Swartzel et al. | |
| 2002/0024332 | A1 * | 2/2002 | Gardner | 324/103 R |
| 2002/0038392 | A1 | 3/2002 | De La Huerga | |
| 2002/0084904 | A1 | 7/2002 | De La Huerga | |
| 2002/0116509 | A1 | 8/2002 | De La Huerga | |
| 2002/0151240 | A1 | 10/2002 | Smith et al. | |
| 2002/0167393 | A1 * | 11/2002 | Mabuchi et al. | 340/5.3 |
| 2003/0099158 | A1 | 5/2003 | De la Huerga | |
| 2004/0020994 | A1 * | 2/2004 | Muehl et al. | 235/492 |
| 2004/0024501 | A1 | 2/2004 | Muehl et al. | |
| 2004/0024570 | A1 * | 2/2004 | Muehl et al. | 702/184 |
| 2004/0033749 | A1 | 2/2004 | Smith et al. | |
| 2004/0039481 | A1 | 2/2004 | De La Huerga | |
| 2005/0091338 | A1 | 4/2005 | De La Huerga | |
| 2005/0218218 | A1 | 10/2005 | Koster | |
| 2006/0058980 | A1 * | 3/2006 | Azpitarte | 702/184 |
| 2007/0204497 | A1 | 9/2007 | De La Huerga | |
| 2008/0136647 | A1 * | 6/2008 | Brown | 340/572.8 |

FOREIGN PATENT DOCUMENTS

| | | | | |
|---|---|---|---|---|
| WO | 0182004 | A1 | | 11/2001 |
| WO | WO 0182004 | A1 | * | 11/2001 |

OTHER PUBLICATIONS

Espacenet English Language Abstract for CN1858806 published Nov. 8, 2006.

"Digital Clockface Timer", Arlec Catalogue, Sep. 26, 2005.

* cited by examiner

SIDE VIEW
SHOWING INTERNAL COMPONENTS
1
14
5
40

REAR VIEW
4
6

TOP VIEW
SHOWING INTERNAL COMPONENTS
5
4
6
1
2

SIDE VIEW
SHOWING INTERNAL COMPONENTS
2

BOTTOM VIEW
SHOWING INTERNAL COMPONENTS
3

FRONT VIEW

ELECTRICAL TAGGING DEVICE

FIELD OF THE INVENTION

The present invention relates to tagging devices for displaying a maintenance state of an electrically-powered device.

BACKGROUND OF THE INVENTION

Employers have a duty of care to ensure that their employees are safe. Testing and tagging of electrical equipment forms part of an employer's responsibility to protect employees and visitors to work sites from electrical hazards arising from defective or damaged equipment.

In many countries, including Australia, electrical articles used in a work place are required to be regularly inspected, tested and maintained by a competent person to ensure they are safe for use. Electrical installations and articles at a work place that are found to be unsafe should be disconnected from the electricity supply and either repaired, replaced or be permanently removed from use.

There will often be requirements that an employer ensure that a record is kept of all inspections and tests made and maintenance carried out on electrical articles and installations.

In Australia, the following information may be recorded:

(a) the name of the person who made the inspection or carried out the test or maintenance;
(b) the date on which the inspection was made or the test or maintenance was carried out;
(c) the results or outcome of the inspection, test or maintenance; and
(d) the date by which the next inspection and test must be carried out.

Equipment that has been inspected should be marked with a tag that displays the following information:

1. name of person/company who performed the test;
2. test date; and
3. expiry date by which further testing must be performed.

The information is written or printed onto a tag, which is attached to the equipment. Current implementations of the testing and tagging system provide limited personal protection and record keeping. Expired leads may still be used mistakenly. In some instances, tags may go unnoticed and equipment such as electrical leads may be used for long periods of time without being re-tested. Equipment such as electrical leads may be misplaced or destroyed without tracking records being updated.

It is desirable, and sometimes a statutory requirement, that records of maintenance should be kept throughout the working life of a piece of equipment. Such records may provide a useful management tool for reviewing the frequency of inspection and test actions, and ensuring that these actions have been carried out.

There is an ongoing need for more efficient and effective ways of marking inspected equipment in order to limit the use of equipment that is not approved for operation.

SUMMARY OF THE INVENTION

According to a first aspect of the invention there is provided an electronic tag for displaying a maintenance state of an associated electrically-powered device, the tag comprising:

data storage for storing data indicative of the maintenance state, the data comprising information defining an expiry date for the maintenance state;

a data processing unit that, in use, monitors a remaining duration to the expiry date;

a display that displays information indicative of the maintenance state; and a cut-out unit that controllably enables transmission of electrical power to the associated electrically powered device dependent on the remaining duration.

In a second aspect the invention relates to a plug configured for insertion into an electrical outlet, the plug comprising an electronic tag for displaying a maintenance state.

In a further aspect the invention relates to an electrical lead comprising an electronic tag operable to store and display the maintenance state of the electrical lead.

According to a further aspect of the invention there is provided a method of monitoring a maintenance state of an electrically-powered device on an electronic tag associated with the device, the method comprising:

storing data on the electronic tag indicating that the electrically-powered device has been successfully tested and defining an expiry date for the maintenance state;

monitoring a remaining duration to the expiry date;

displaying information indicative of the maintenance state;

enabling transmission of electrical power to the device if the remaining duration exceeds a specified value; and disabling transmission of electrical power to the device if the remaining duration is less than the specified value.

BRIEF DESCRIPTION OF THE DRAWINGS

Embodiments of the present invention are discussed below with reference to the accompanying drawings, in which.

DETAILED DESCRIPTION OF THE EMBODIMENTS

An electronic tag is described that reduces the potential hazard of untested electrical equipment being put into operation mistakenly. In one application, the electronic tag is used to tag electrical leads used to supply power to electrical appliances. The electronic tag may also be used in conjunction with other types of electrical equipment.

Figure 1A:
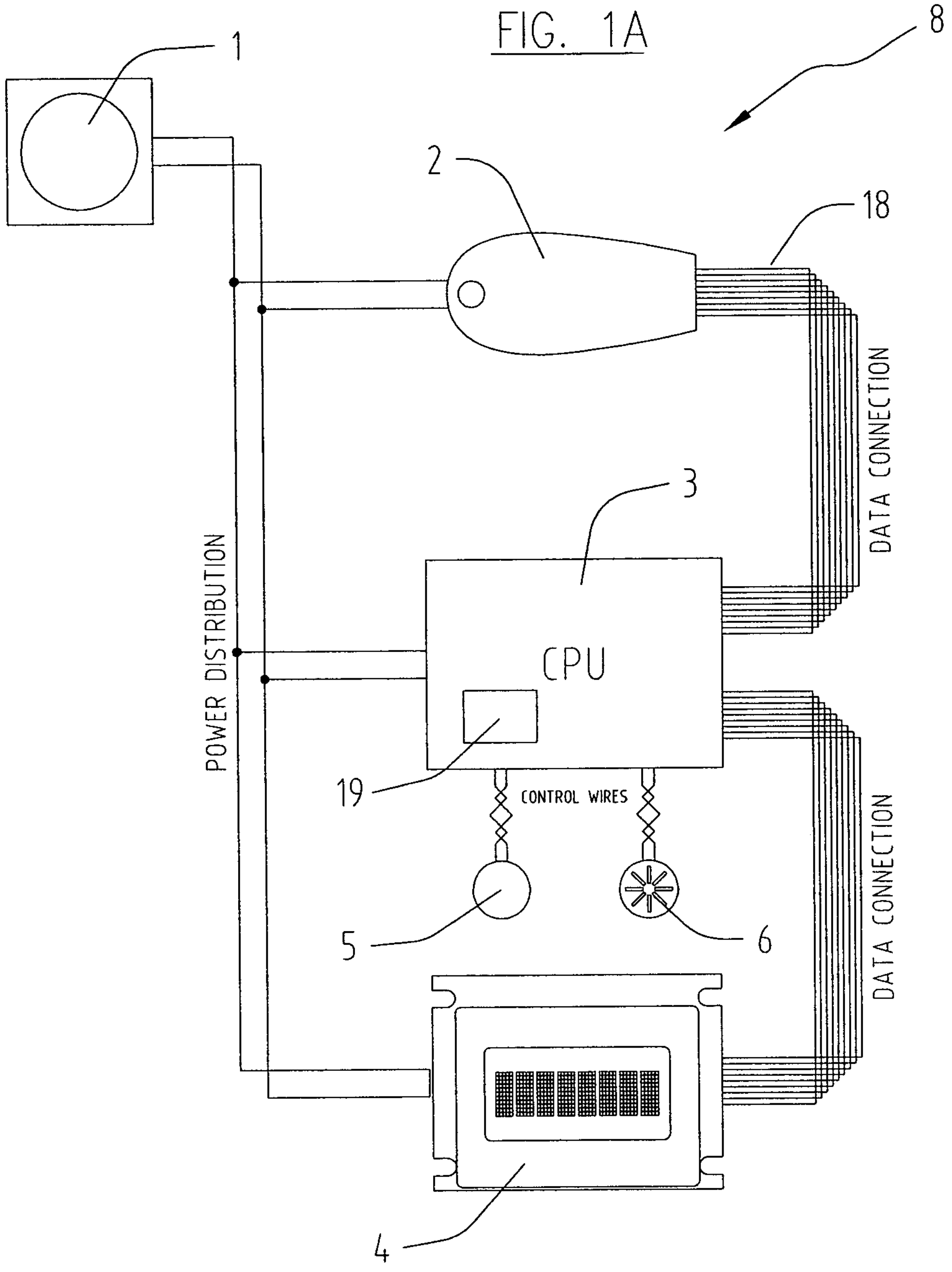
FIG. 1A shows a schematic block diagram of an electronic tag.

FIG. 1A is a block diagram showing an embodiment of the electronic tag 8. The tag 8 includes a data storage unit 2, which may be a radio-frequency (RF) programmable device. An example of such a device is the ProxKey™ II device provided by HID Corporation. Such RF-programmable devices typically have compatible programming devices that may be used to store data on the RF-programmable storage 2 or read data from the data storage 2. For example, a ProxProgrammer device is available from HID Corporation to write data to or read data from the ProxKey II data storage. Other storage devices may also be used, such as a FLASH memory device.

The electronic tag 8 also includes a data processing unit 3 which may, for example, be a microprocessor or microcontroller. Alternatively, the processing functions of the data processing unit 3 may be implemented in dedicated hardware, for example an application-specific integrated circuit (ASIC), Field Programmable Gate Array (FPGA) device, or a hybrid between these devices. For example, a PIC24FJ64GA004 microcontroller may be used. The data processing unit 3 is in data communication 18 with the data storage 2. The data processing unit 3 may also have a data storage, such as a FLASH memory.

The electronic tag 8 also includes a display 4. In the illustrated embodiment the display is a liquid crystal display (LCD). One example of a suitable LCD display is the MC0802A-SGR device supplied by Everbouquet, which can display two lines of text having 8 characters each.

In an alternative implementation, the display 4 may incorporate one or more light emitting diodes (LEDs) or a LCD to indicate a maintenance state of the electrical appliances associated with the electronic tag 8. The LED is also in data communication with the data processing unit 3.

In the present description, the term 'maintenance state' refers to information indicating whether or not equipment associated with the electronic tag meets specified maintenance criteria.

The electronic tag 8 may include a power source 1 that distributes power to the data storage 2, data processing unit 3 and display 4. Thus, even when the associated appliance is switched off, the display 4 can display the maintenance status of the appliance.

The electronic tag 8 may also include an audio output such as a speaker or buzzer 6 that may be used to emit an audible signal when the appliance using the electronic tag 8 requires further scheduled testing.

One or more user controllable components 5, such as switches or buttons 5 may also be provided. Various types of buttons, such as mechanical buttons or capacitive touch buttons, may be used. In one arrangement, the button 5 acts to select the information to be displayed on the LCD 4. In some embodiments, the tag 8 may operate in a default mode or in a testing mode. The tag 8 is generally in the default mode, but is switched to the testing mode when the appliance is being tested. In the default mode, the expiry date of the maintenance status of the appliance is displayed on the display 4. Pushing the button 5 will cause further data to be shown on the display 4.

The buttons 5 may further be used to control other functions of the controller, or the device to which the tag 8 is attached. The buttons 5 could be used to silence the tag 8 in an embodiment where the tag 8 sounds alerts, for example when the maintenance check is overdue. The buttons 5 may be pushed to immediately disable the tag 8, for example when a electrical cable is broken or faulty.

A real-time clock device (RTC) 19, which has an associated battery, is used to maintain accurate measure of the current date and time whilst mains power is disconnected. The RTC 19 may be implemented in an external device (see FIG. 1B).

Figure 1B:
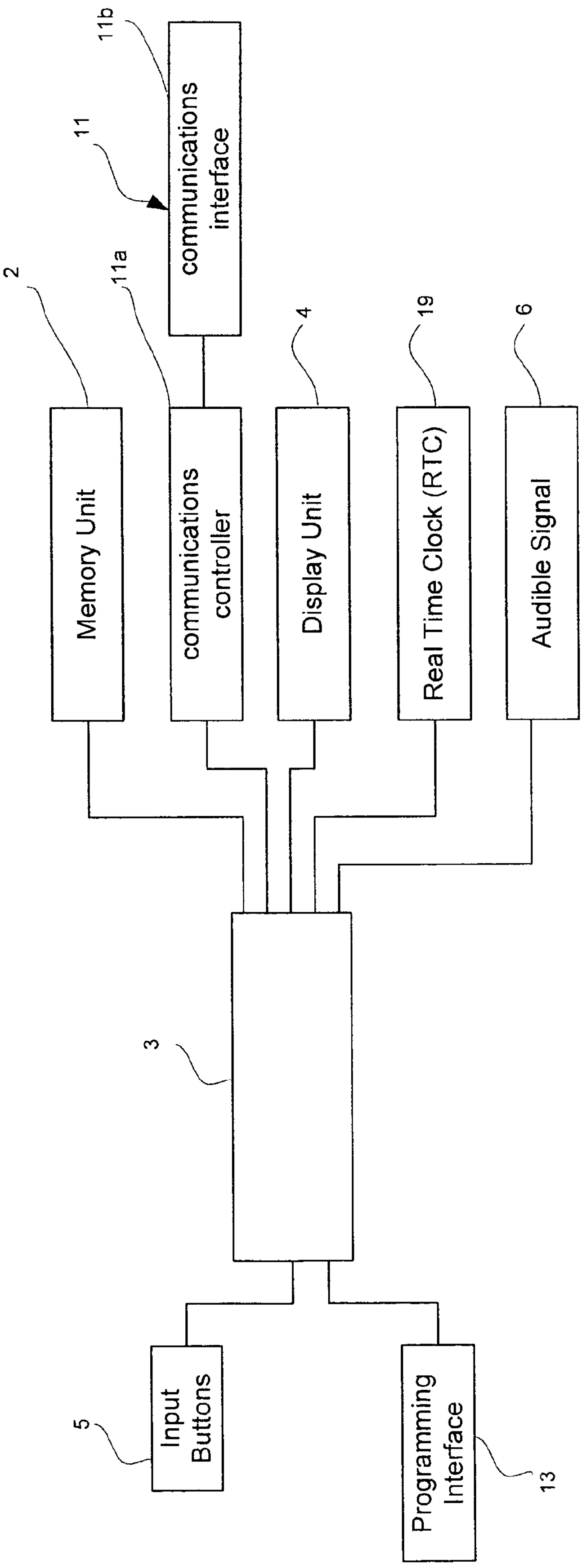
FIG. 1B shows a functional block diagram of an electronic tag according to another embodiment.

Referring to FIG. 1B, the electronic tag 8 may have a communication interface 11. The button 5 may be used to enable or disable the communications interface 11, so as to enable or disable the data transfer between the tag 8 and an external device.

The communications interface 11 allows the electronic tag 8 to communicate with an external electronic device, such as a computer, PDA, or a purpose built device. This enables a transfer of data to the tag 8, for example during an update of test data, or a transfer of data from the tag 8, for example during a retrieval of existing or prior test data. The communications interface 11 may include a communications controller 11*a* and a communications interface 11*b*. The communications controller 1 la may be a Universal Asynchronous Receiver/Transmitter (UART) controller, an Infrared Data Association (IrDA) controller, a Universal Serial Bus (USB) controller, or any other device that implements a communications protocol. The communications interface 11*b* is the physical connection that provides the data communication under the protocol used by the communications controller 11*a*. The tag 8 may include multiple communication interfaces 11 of the same or different types. The interface 11 may be implemented via one or more of a wide range of methods, including, but not limited to:

- a direct serial link connection to a computer;
- proximity radio frequency communication to the RF tag 2;
- Bluetooth™, 802.x, or similar wireless communications;
- Infra-red communications devices; and
- power line carrier signals superimposed over a mains power supply.

The tag 8 may further include a programming interface 13 (see FIG. 1B). The programming interface 13 allows the updating of software and identification codes stored on the data processing unit 3. In one example, the programming interface 13 consists of a wired serial connection for the data processing unit 3. In other examples different interfaces may be used.

Figure 2B:
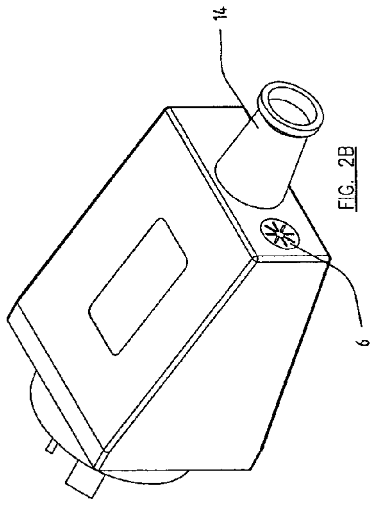
FIGS. 2A-2D show four perspective views of a plug incorporating the electronic tag of FIG. 1A or FIG. 1B for storing and displaying a maintenance state of the plug.
Figure 2D:
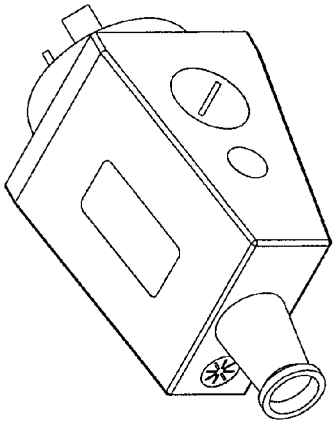
Figure 2A:
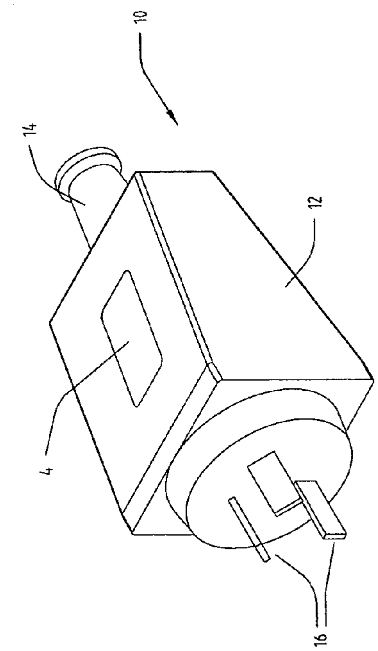
Figure 2C:
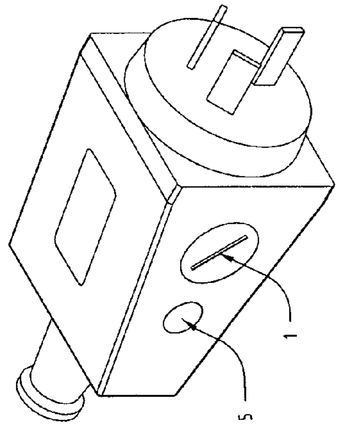

FIGS. 2A-2D show an arrangement in which the electronic tag 8 is incorporated into a plug 10, which may, for example, be formed of moulded plastic. The plug 10 has a housing 12 and a set of prongs 16 configured to be inserted into a power outlet. The prongs 16 illustrated herein have the shape and configuration used in Australia. It will be understood that other shapes and configurations of prong 16 may be used when appropriate. The housing 12 has a protruding collar 14 for holding an electrical lead that extends from the plug 10. In the depicted arrangement, the display 4 is positioned on a top surface of the plug 10. As seen in FIG. 2B, the speaker 6 may be positioned on a rear surface of the housing 12 adjacent to the collar 14. The button 5 and battery 1 may be accessed via a side wall of the housing 12, as seen in FIGS. 2C and 2D. Other shapes and configurations of plug 10 incorporating electronic tag 8 may also be used.

Figure 2E:
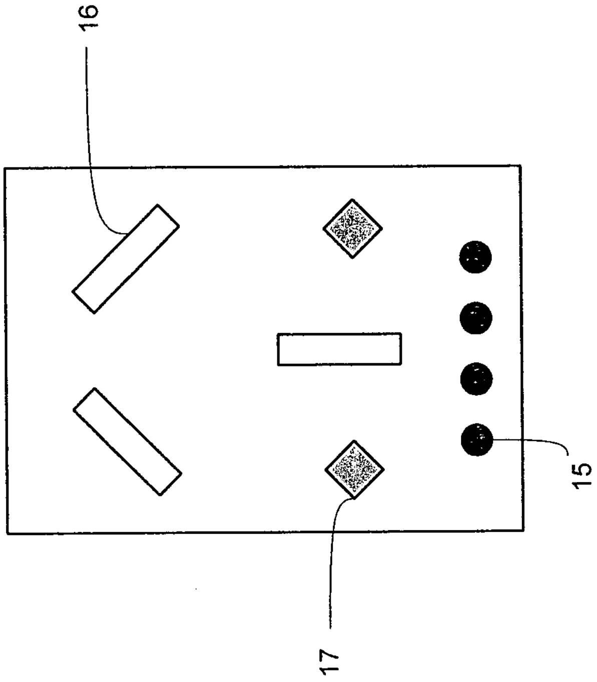
FIG. 2E shows a schematic end view of a plug incorporating the electronic tag of FIG. 1A or FIG. 1B for storing and displaying a maintenance state of the plug.
Figures 3A, 3B, 3C, 3D, 3E, 3F:
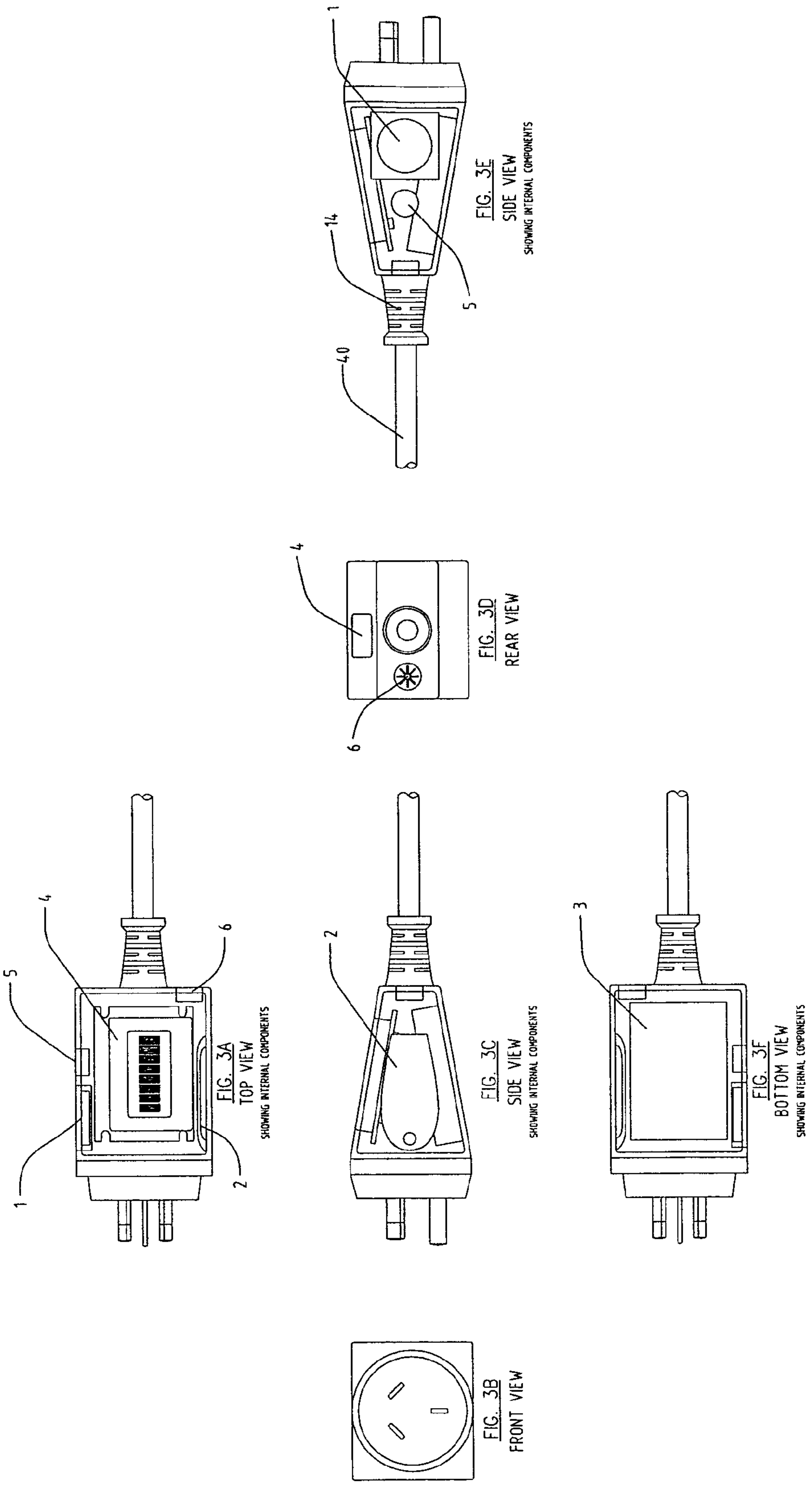
FIGS. 3A-3F show, respectively, a top view, front view, left side view, rear view, right side view and bottom view of an embodiment of the plug of FIG. 1A or FIG. 1B, showing internal components.

As shown in FIG. 2E, the plug may also contain one or more sockets 15 on the same face as the prongs 16. The sockets may be used to provide an interface for a testing unit used by a competent person. The sockets may have purposes including, but not limited to, providing a power source to the tag during testing mode, and providing serial communications to the device. There might also be sockets 17 for activating a switch that bypasses the tag electronics during testing mode, as discussed in more detail below.

FIGS. 3A-3F show further views of the plug 10, illustrating the internal disposition of the elements 1-6 of electronic tag 8. The views shown in FIGS. 3A-3F also show a portion of an electrical lead 40 extending from the collar 14.

Figure 4A:
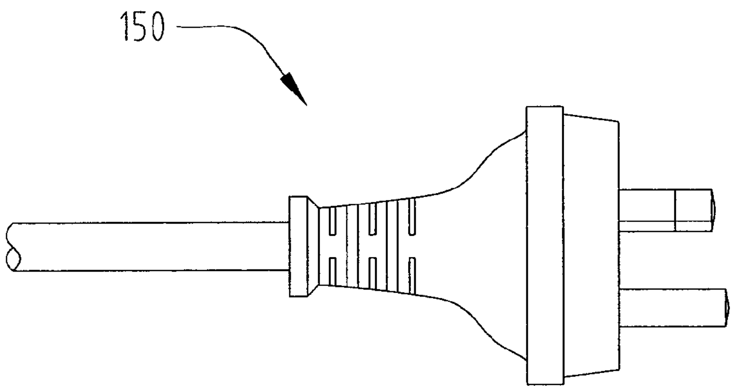
FIG. 4A shows a conventional plug and electrical lead.
Figure 4B:
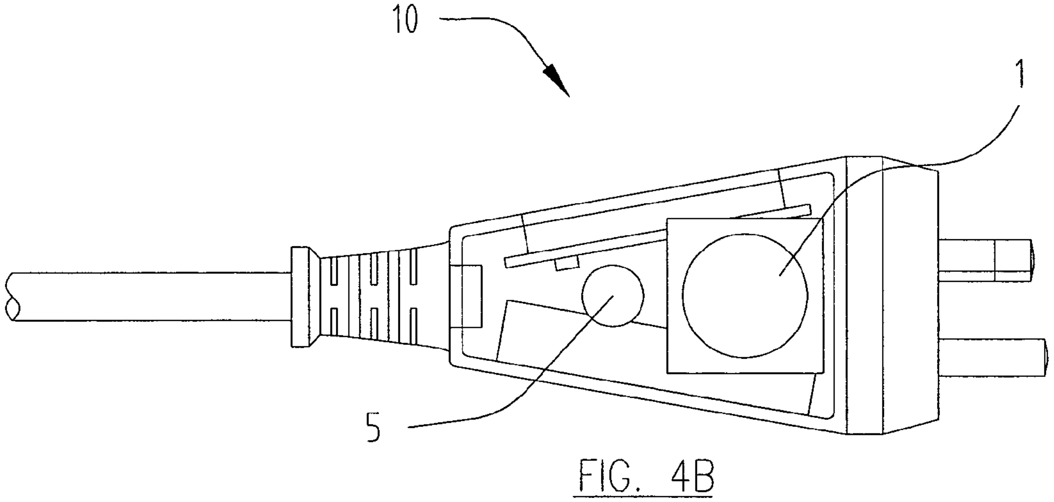
FIG. 4B shows a plug and lead incorporating the electronic tag of FIG. 1A or FIG. 1B.

FIGS. 4A and 4B provide a comparison between a conventional plug 150 and the plug 10 incorporating the electronic tag 8.

In the following discussion, the use of the electronic tag 8 will be described in relation to the testing and maintenance of electrical leads. However, it will be understood that the electronic tag 8 may also be used in conjunction with other electrical appliances that require scheduled inspection and maintenance.

Method of Testing and Tagging

At an appropriate time, a competent person tests the plug 10 and lead 40. When testing a lead containing the electronic tag 8, the competent person may follow the usual testing procedures. In certain configurations of the tag, the tag may need to be plugged into a purpose-built testing unit, the unit preventing damage to the tag and enabling communications. Once satisfied that the lead meets specified criteria, the competent person establishes a data connection to the electronic tag 8, and inputs test data into the electronic tag 8. As mentioned above, the data communication with the electronic tag 8 may be via computer software or a hand-held programming device that uses, for example, an RF proximity link.

The data entered into the electronic tag 8 is stored on data storage 2. The data storage 2 may be a non-volatile re-writable (NVRW) storage that does not require power to retain the data content for some time. Sufficient data storage space may be provided to meet local regulatory requirements. The data stored on the data storage 2 may include:

- an identification code unique to the plug 10 and lead 40;
- the name of the person or company who performed the testing;
- the date of the test;
- the expiry date at which the validity of the current test expires and further testing should be performed; and
- information relevant to tracking the plug 10 (for example a location where the plug is currently in use).

The competent person doing the testing may also replace the battery 1 to ensure that the electronic tag 8 remains powered until the next scheduled testing. The data storage 2 is preferably non-volatile, so that even if the battery 1 is exhausted, the stored data persists.

In one arrangement, once the appliance has been tested the electronic tag 8 displays the expiry date at which the next scheduled inspection is due. The format of the data displayed on display 4 may depend on regulatory requirements in the jurisdiction where the electronic tag 8 is used. In other arrangements the display may show the time remaining until the period of validity expires. Alternatively, the display may show how much time has elapsed since the last test.

In the arrangement where the display 4 includes a LED, the state of the appliance may be indicated by the colour of the LED. An example of this is as follows:

- solid green: the maintenance status of the appliance is satisfactory and the appliance may be used;
- flashing green: the appliance may still be used but the expiry date is approaching and a new test should be arranged; and
- red: the expiry date has passed and the lead should no longer be used until an inspection has been completed.

The RTC 19 provides time information. The data processing unit 3 monitors the current time and date and compares this information with the scheduled expiry date for the lead.

Once the remaining duration to the expiry date falls below a specified threshold, the data processing unit 3 sends a control signal to speaker 6 and an audible signal is emitted. In one arrangement, an intermittent signal is initially sounded to alert users to the fact that the scheduled test date is approaching. The signal may be temporarily silenced via the button 5. As the remaining duration decreases, the audible signal may become more insistent, increasing the probability that the lead will be inspected. If the electronic tag 8 includes an LED, a control signal may be sent to the LED to change the colour or pattern of emitted light when the remaining duration to the expiry date falls below the specified threshold.

The method is not limited to a count-down system. For example, the tag may monitor elapsed time and issue a control signal when the elapsed time exceeds a specified threshold.

The use of the electronic tag 8 also makes it easier to track the location of associated devices. For example an RF reader may be held near the tag 8 to register and/or record ID information of the associated device. The electronic tag 8 thus makes it easier to use a software-controlled inventory system to schedule testing of leads in electrical appliances.

Data Storage

The data storage 2 may include an amount of on-board memory sufficient to store not only the most recent test information required by law, but also previous test results. For example, some Australian Standards require that any testing records be kept for a minimum of seven years. In one arrangement, the data storage 2 has sufficient capacity to store this amount of information. The most recent set of test results may be read on LCD 4 by pressing button 5 to display the test results. Earlier test results may be read from the data storage 2 using the external programming device used to program the electronic tag 8.

Conventional implementations of the testing and tagging procedure rely on an external database to store the required testing history of each lead. Such conventional arrangements have the disadvantage that the database may be lost, damaged or physically located in another geographical area, rendering the information inaccessible. The electronic tag 8 helps to address these issues by storing data on the lead itself. The complete test history of the lead is readily available at any time within the electronic tag 8. This allows instantaneous information access, and may be beneficial during investigations into workplace incidents involving the leads.

In the arrangements described herein, the test data may still be stored in an external database. For example, the test data may be stored temporarily on a hand-held device used to program the electronic tag 8, and subsequently downloaded or transferred to an external database. If at any time this database becomes unavailable or damaged, the test data is still accessible on the leads themselves. The database could be re-built by uploading the complete test history stored within the electronic tags 8.

Electronic Tag with Cut-Out Facility

Figure 5A:
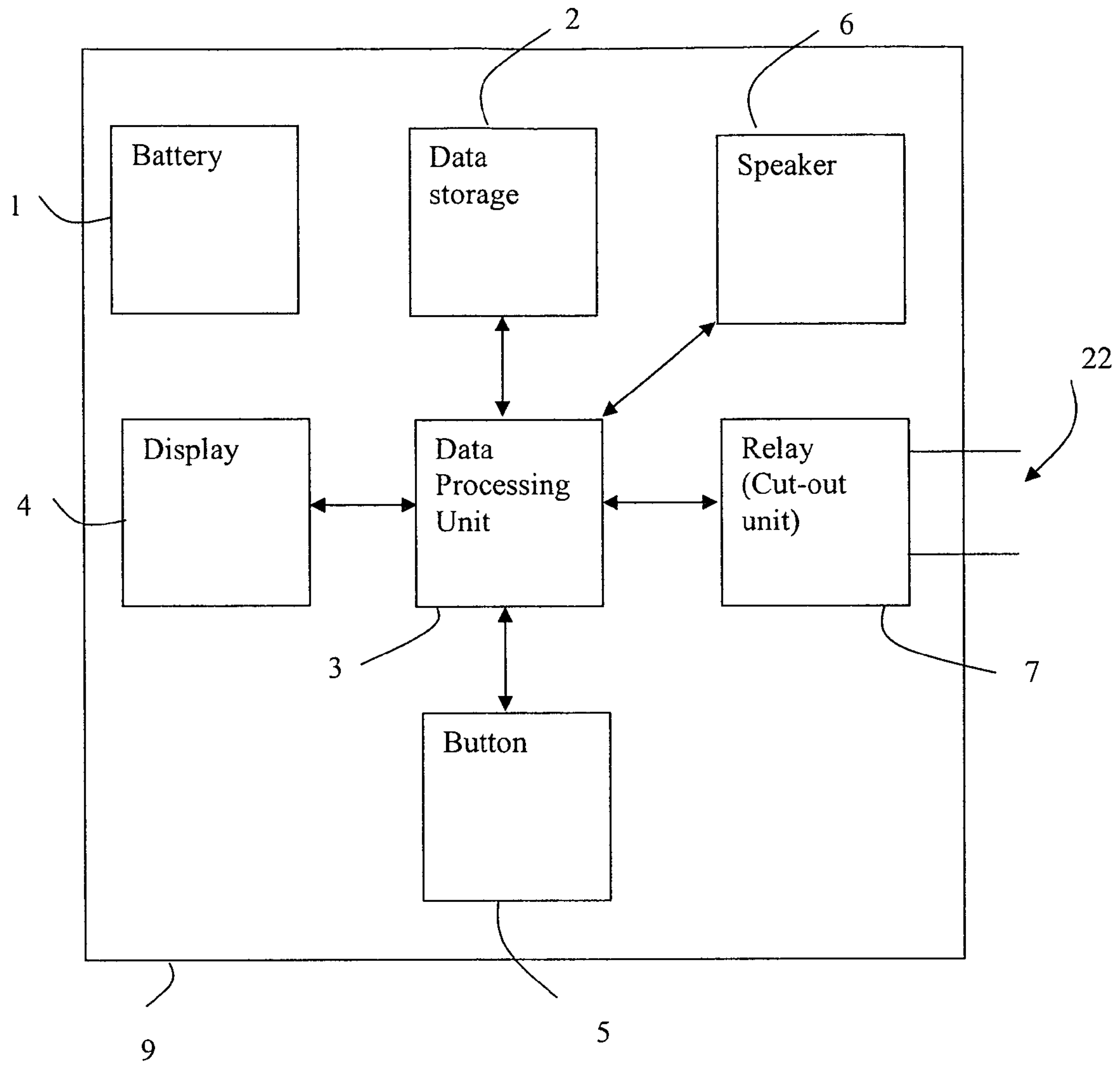
FIG. 5A is a schematic diagram of electronic tag that includes a cut-out relay.

In another arrangement seen in FIG. 5A, an electronic tag 9 includes a cut-out apparatus, for example a power circuit relay 7. The default position of the relay 7 is open circuit. The data processing unit 3 tracks whether the expiry date has yet been reached. If not, the data processing unit 3 sends a control signal to the relay 7, which closes, allowing a current to flow through leads 22. The leads 22 may, for example, be connected to electrical lead 40, and thus closing relay 7 enables the lead 40 to supply power.

If the expiry date has already been reached, the data processing unit 3 will not close the power circuit relay 7 to energise the leads. If the electronic tag 8 fails, the associated lead will remain de-energised. The tag thus has a fail-safe operation.

Figure 5B:
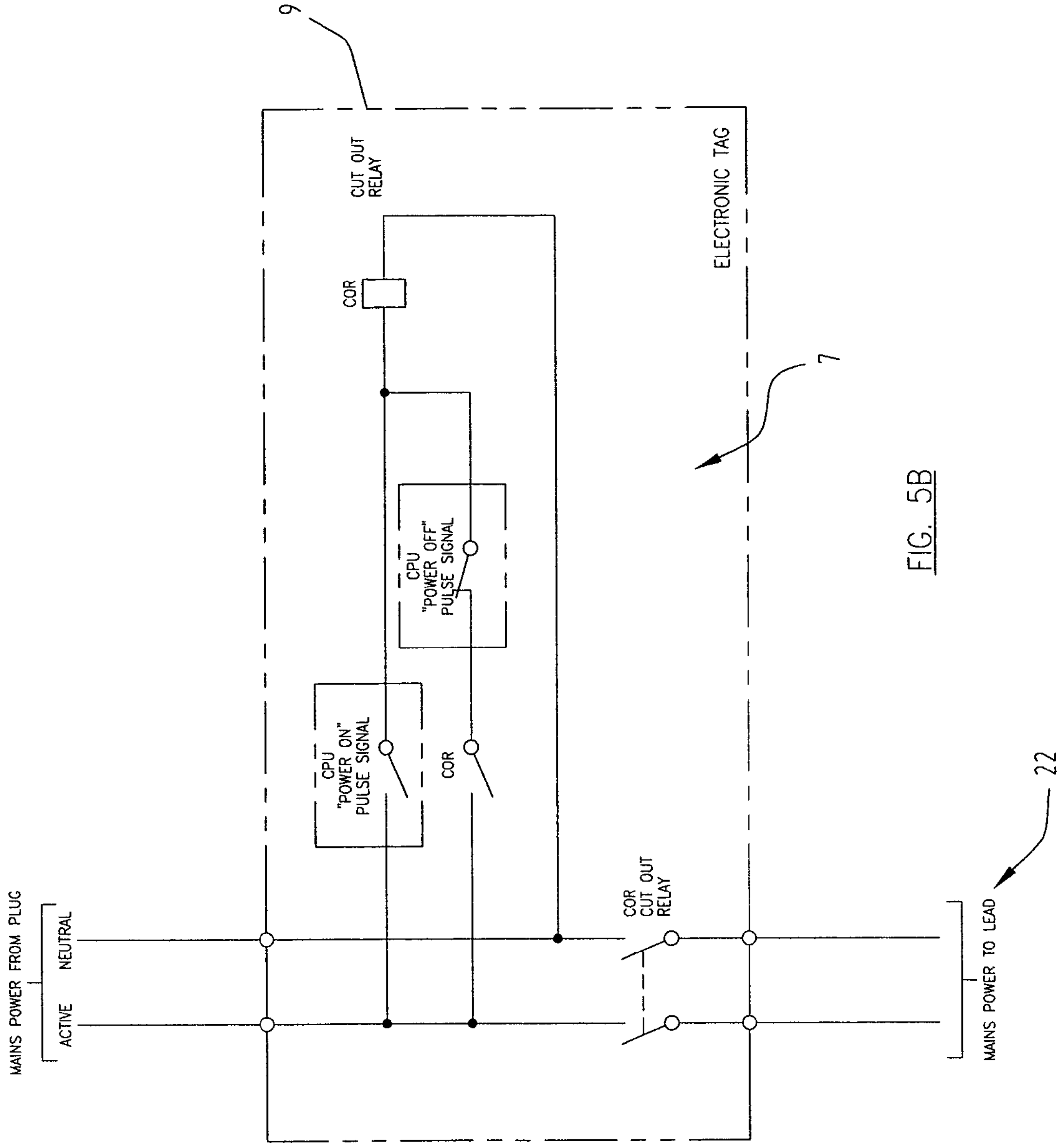
FIG. 5B is a schematic circuit diagram of an electronic tag having a cut-out relay.

FIG. 5B shows an example of an electronic tag 9 including a cut-out relay 7. The relay is powered by the mains power supplied to the leads 22. Software running on the data processing unit 3 checks whether the expiry date of the lead has been reached. If the lead is still valid, the data processing unit sends a pulse signal to power up the relay 7. If the expiry date is reached, the data processing unit 3 sends a "power off" pulse signal, which acts to return the relay 7 to an open circuit. Consequently, no power is provided via leads 22.

Figure 5C:
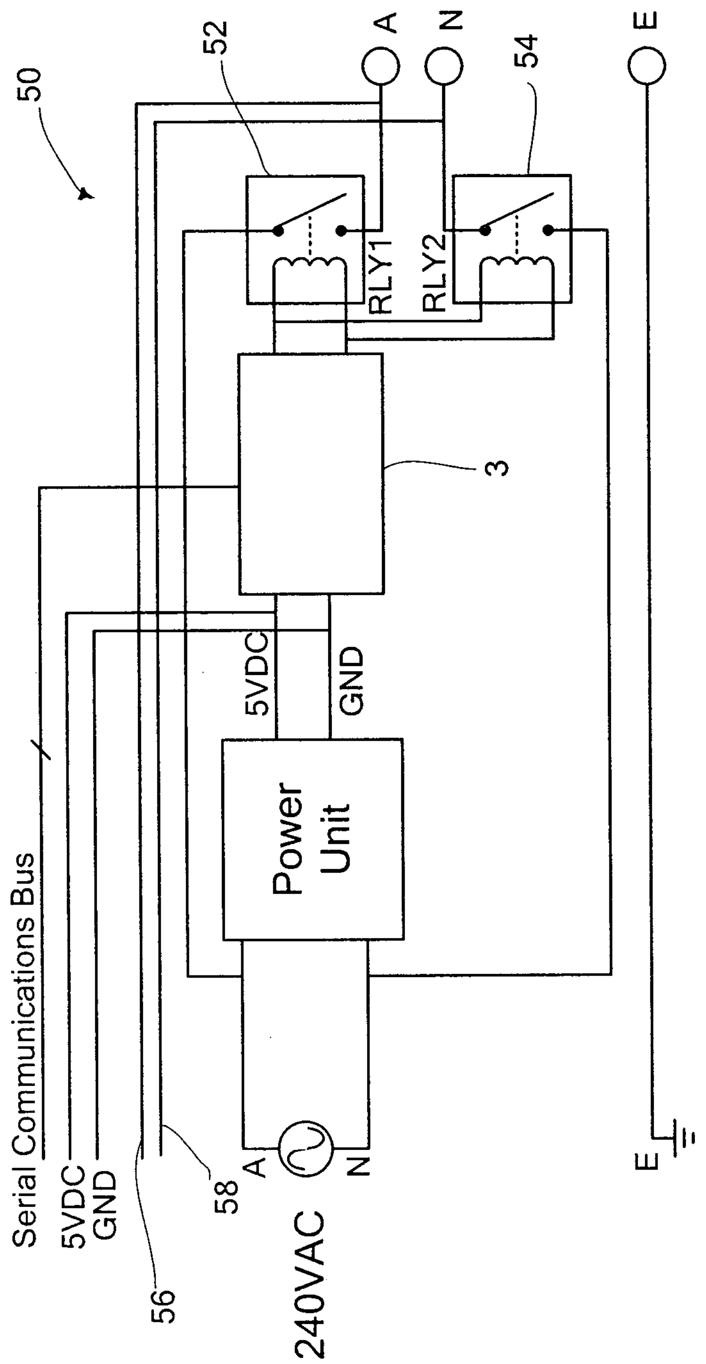
FIG. 5C is a schematic circuit diagram of an electronic tag having two cut-out relays.

FIG. 5C shows another example of an electronic tag 50 including the cut-off function. In this example, the tag 50 includes two relays 52, 54. One relay 52 isolates the active line (A) of the mains power, and is normally open. It is triggered by the data processing unit 3 to allow or deny connection of the active power rail to the appliance or electrical leads. The other relay 54 may be provided to isolate the neutral line (N) of the mains power.

The data processing unit 3 communicates with a testing unit used by a person who conducts the equipment testing, and receives updated data from the testing unit or sends an existing data to the testing unit. This communication may be enabled by a serial communication bus, and the bus may further transmit signals from the testing unit to the data processing unit 3, to instruct the data processing unit 3 to open the relays 52, 54 during the test mode.

The testing is done through test point 56, 58 that respectively connect to the active and neutral lines of the mains power. When the tag 50 is in testing mode, it may receive power from the mains power (240V in Australia), or from an external source. For example the tag 50 may receive power from a 5V power source of the testing unit.

Figure 5D:
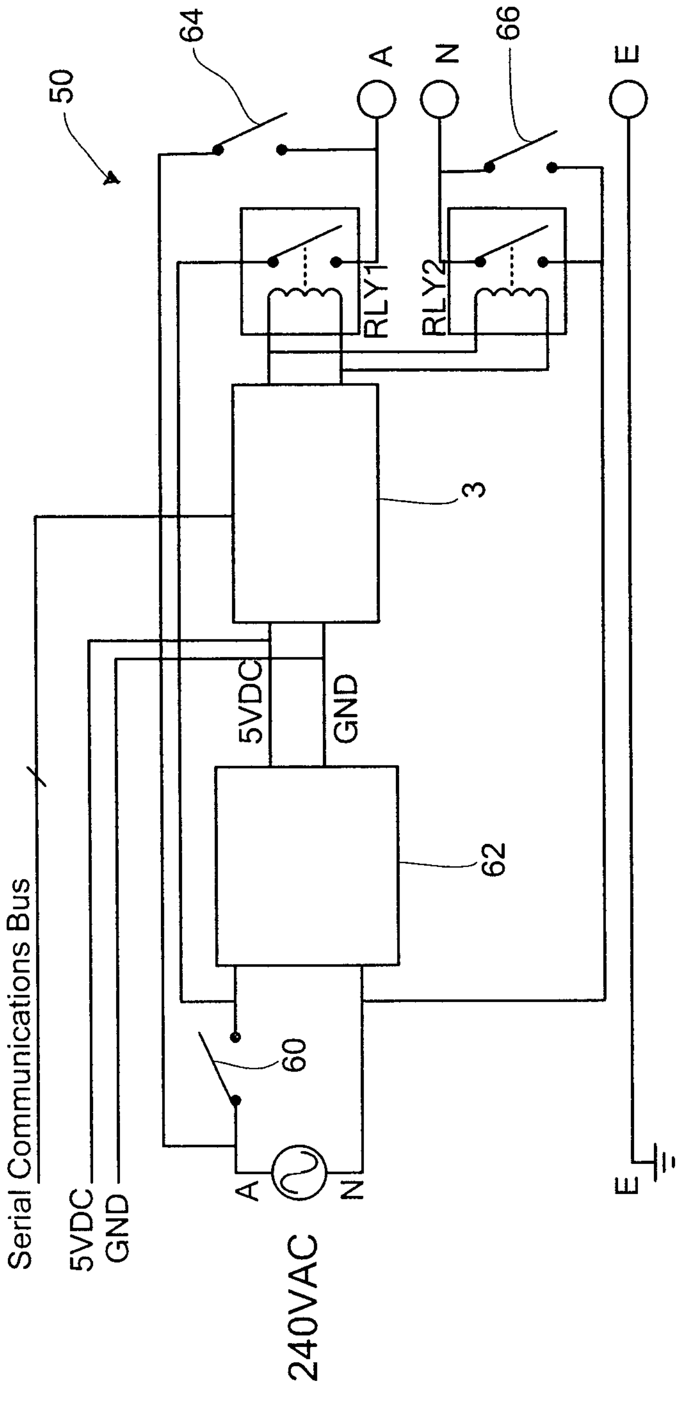
FIG. 5D is a schematic circuit diagram of a switched electronic tag having two cut-out relays.

As shown in FIG. 5D, the tag 50 may further be fitted with switches. A rail switch 60, for example a dual pole mechanical switch, may be provided between the mains power and the power unit 62 of the tag 50. The switch 60 may be provided on the active line of the mains power. This switch 60 is normally closed, so that it provides power to the tag 50 under normal operating conditions.

Other switches may be provided. An active line switch 64 may be provided between the active line of the mains power and the active line lead. An optional neutral line switch 66 may be provided between the neutral line of the mains power and the neutral line lead. These switches 64, 66 are normally open, but they may be closed to bypass the data processing unit 3 and cut-out relays. This arrangement allows the leads to be tested, without damaging the electronics in the data processing unit 3.

The active line switch 64 and the neutral line switch 66 may be closed when the tag 50 is connected a testing unit. For example, when a tag having a configuration as shown in FIG. 2E is used, the pins of the testing unit may press into the sockets 17 to activate (close) the bypass switches 64, 66, thereby 'switching' the tag into testing mode.

APPLICATIONS

The electronic tags may be associated with several types of electrical leads.

Application 1

The electronic tag 8 or 9 is embedded into a moulded plug 10 on the end of an electrical lead 40, suitable for connection to an electrical outlet. This requires the electronic tag 8, 9 to be embedded into electrical leads on devices such as (but not limited to):

computer leads;
office equipment;
extension leads;
power boards; and
electrical appliances.

Application 2

The electrical tag 8 or 9 is embedded in a moulded plug top 10 that may be attached to an existing lead 40, in order to retrofit existing appliances. A suitably competent person cuts off an existing plug and installs a new plug 10 including an electronic tag 8, 9. In this way, any existing appliance may be retrofitted with the electronic tag 8 or 9. Some examples include (but are not limited to):

microwave ovens;
conventional extension cords;
conventional power boards; and
other mains-powered devices and appliances.

Application 3

Figure 7:
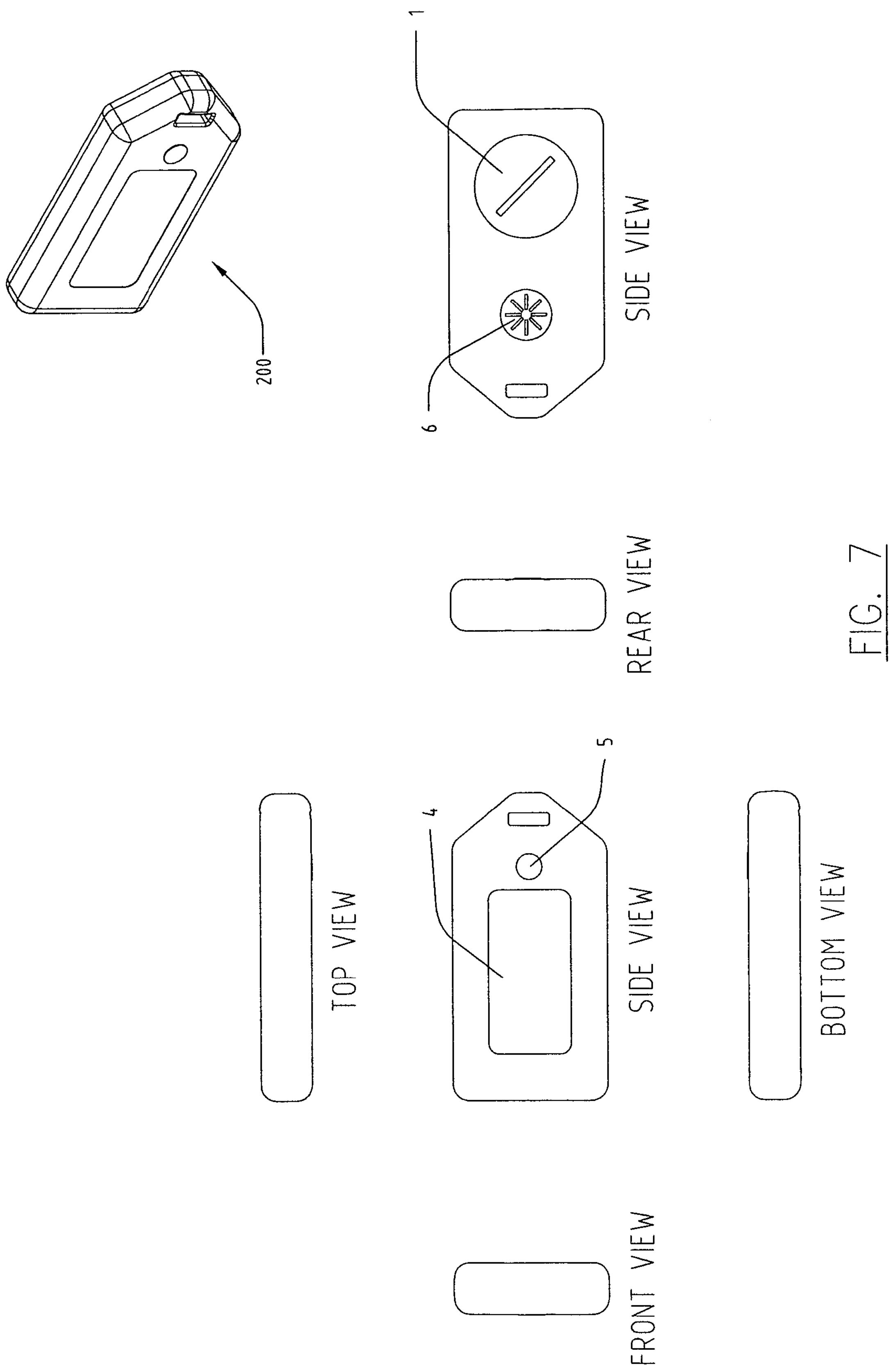
FIG. 7 shows a perspective view of an electronic tag operable for attachment to tested equipment, together with a top view, front view, rear view, bottom view and side views of the tag.

The electrical tag 8 is provided as a separate unit 200 external to a moulded plug, as illustrated in FIG. 7. The separate unit 200 may be clipped around the lead, preferably near the plug. Because this unit is external to the lead, it does not include the cut-out option of the electronic tag 9. The tag 200 displays the expiry date and/or other testing information as described above, and also includes the audible alarm. The electronic tag 8 is configured such that removing the separate unit from the lead disables the separate unit, preventing inappropriate re-use. In one arrangement removing the unit causes the tag 8 to be reset to indicate that the tag has expired. Alternatively, the unit may be configured such that removal of the separate unit from the lead results in physical damage to the separate unit.

The externally applied electronic tag 8 is suitable for appliances that use transformers or other non-standard plug packs that it is not appropriate to cut off and replace with electronic tags 8 as described in application 2 above.

Distributed Components

Figure 8:
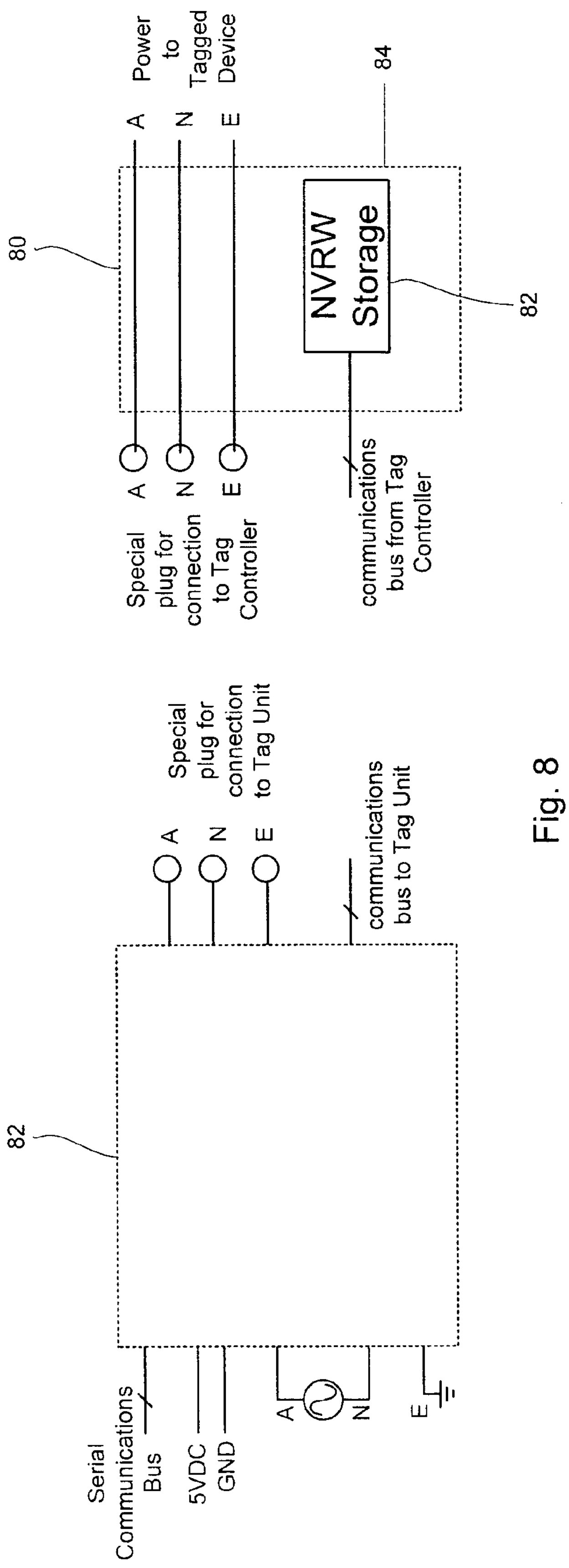
FIG. 8 shows a schematic block diagram of a tag having two modules.

As shown in FIG. 8, the key components of the tags described herein may be split between two or more modules, for example, a tag unit 80 and a tag controller 82. A tag unit 80 contains, at a minimum, the data storage component(s) and is attached to the equipment to be tagged. The tag unit 80 may contain a customised arrangement of prongs such that it cannot be plugged into a standard power outlet. The tag unit 80 contains additional sockets or prongs for the purpose of obtaining power from the tag controller 82, and sharing data with the tag controller 82.

The tag controller contains the tag components not included in the tag unit 80, and connects to the tag unit via a matching set of sockets and/or prongs. In principle, the tag controller 82 contains the parts that are not specific to the tagged device (i.e. the appliance). The tag unit 80 thus becomes the "tag" at a minimal cost, and the tagged device may be restricted to being powered via a tag controller.

The way in which the tag components are split between the tag controller 82 and the tag unit 80 can vary. For example, the tag controller 82 may include the low voltage power supply for supplying power to tag unit, and all other tag components are included with the tag unit. In another example, the tag controller 82 may further include the RTC 19 (not shown) and the battery used by the RTC, and these parts are removed from the tag unit 80. In a further example, the tag unit 80 may only have a non-volatile re-writable (NVRW) data storage 84 and the audio and/or display components (not shown) for the tag, all of which may be directly controlled by the tag controller 82.

The NVRW data storage 84 can hold different information. For example, the data storage 84 may contain the past test data, or one or a combination of the types of information previously described above. In one embodiment, the information stored in the data storage 84 may include only a unique identifier that distinguishes one tag unit 80 from another tag unit 80. In this embodiment, the tag controller 82 only activates the tag unit 80, if the tag controller 82 recognises the identifier of that tag unit 80. The tag controller 82 may further check the tag unit's maintenance state before activating the tag unit 80.

Figure 9A:
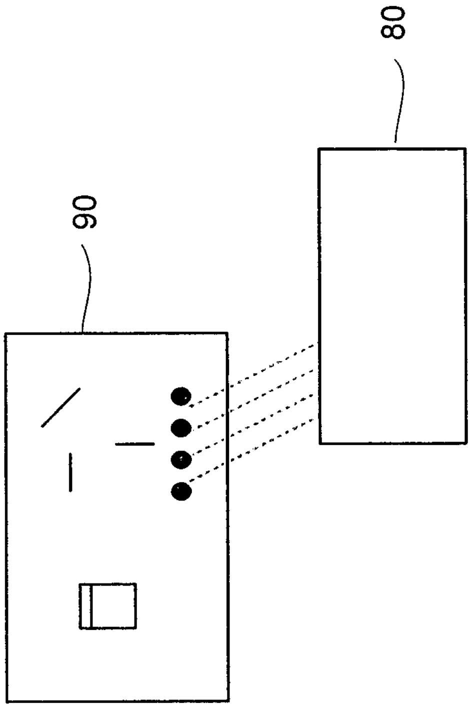
FIG. 9A shows a schematic view of a power outlet that incorporates components of a tag.

There are various ways in which the distributed electronic tag configuration may be applied. For example, the tag controller 82 may be incorporated into a power outlet 90 (see FIG. 9A). In one configuration the tag controller 82 contains a set of prongs for connection to a standard power outlet. Alternatively, the tag controller 82 may be integrated into a customised wired power outlet or "power board"

Figure 9B:
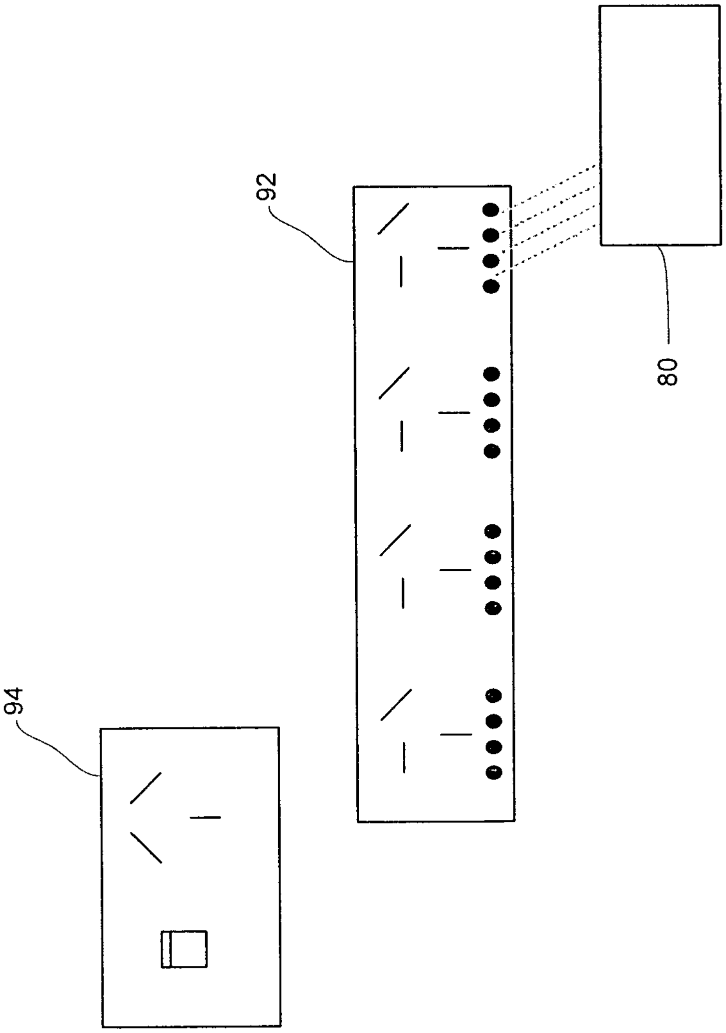
FIG. 9B shows a schematic view of another power outlet that incorporates components of a tag.

In another example (see FIG. 9B), the tag controller 82 is integrated into a multi-outlet power board 92 that has multiple outlets for connection with multiple tag units 80, and plugs into a standard power outlet 94. In this example, there may be one or more tag controllers within the board, and each of the tag controllers may control one or more tag units. Multiple tag controllers may share common resources. For example, all of the tag controllers may use a single serial communications interface to retrieve data from each of the tag units.

Figure 9C:
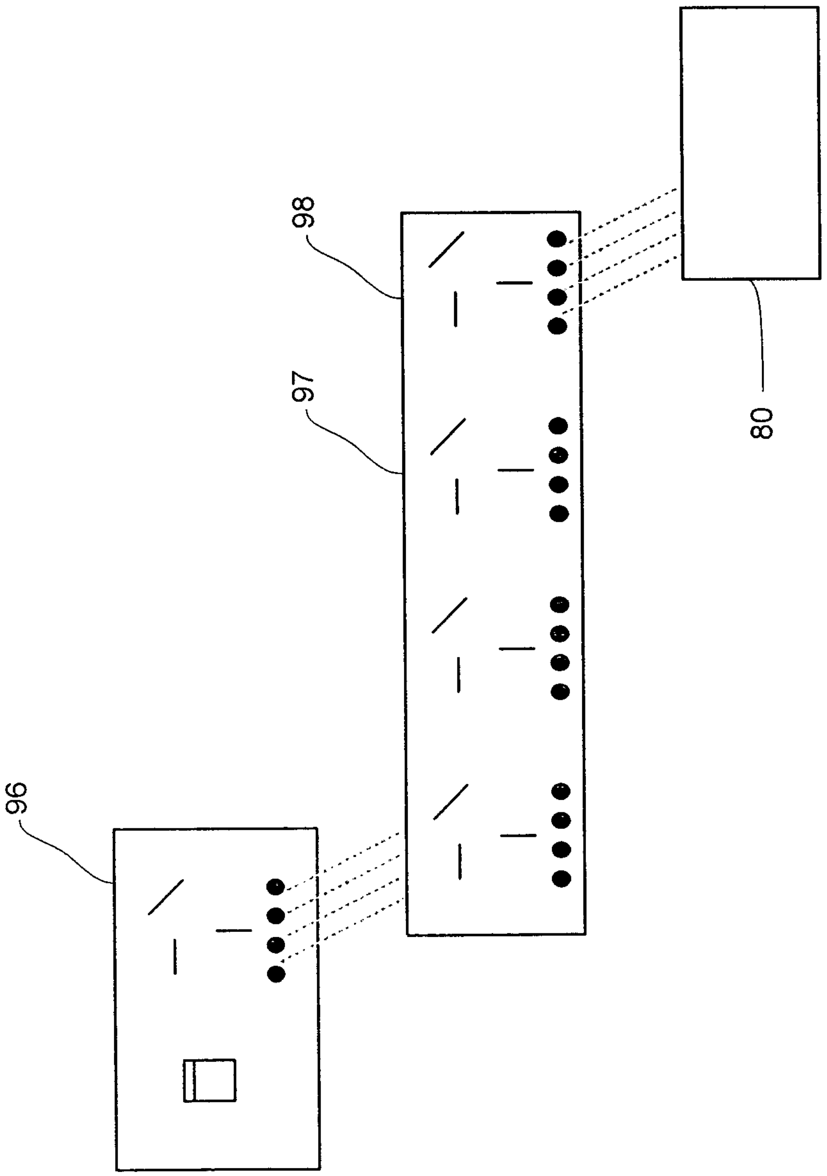
FIG. 9C shows a schematic view of still another power outlet that incorporates components of a tag.

Further arrangements are possible. For example, FIG. 9C shows a 'networked' arrangement. A central tag controller may be incorporated into a modified power outlet 96. One or more local tag controllers may be incorporated into a multi-outlet board 98 that can be connected to the central tag controller. One or more tag units 80 may be connected to one of the local tag controllers 97, or directly to the central tag controller.

In a networked arrangement, it is possible for all the modules to share at least some resources, such as a low voltage power supply, and a communication bus. The common communication bus allows the modules to share information. Moreover, a central data storage, which may be located in the central tag controller, may contain all of the information and test data from the test units that are directly or indirectly supported by the central tag controller. In one embodiment, a tag unit that is plugged into this 'network' will only be recognised or activated if its unique identifier is recognised by the central tag controller. For example, the central tag controller may use the unique identifier of a tag unit to obtain test data associated with that tag unit from the data storage. The central tag controller may further only activate the tag unit if it has determined that the test data associated with that tag unit is up to date.

Test and Tagging Machine

Figure 6:
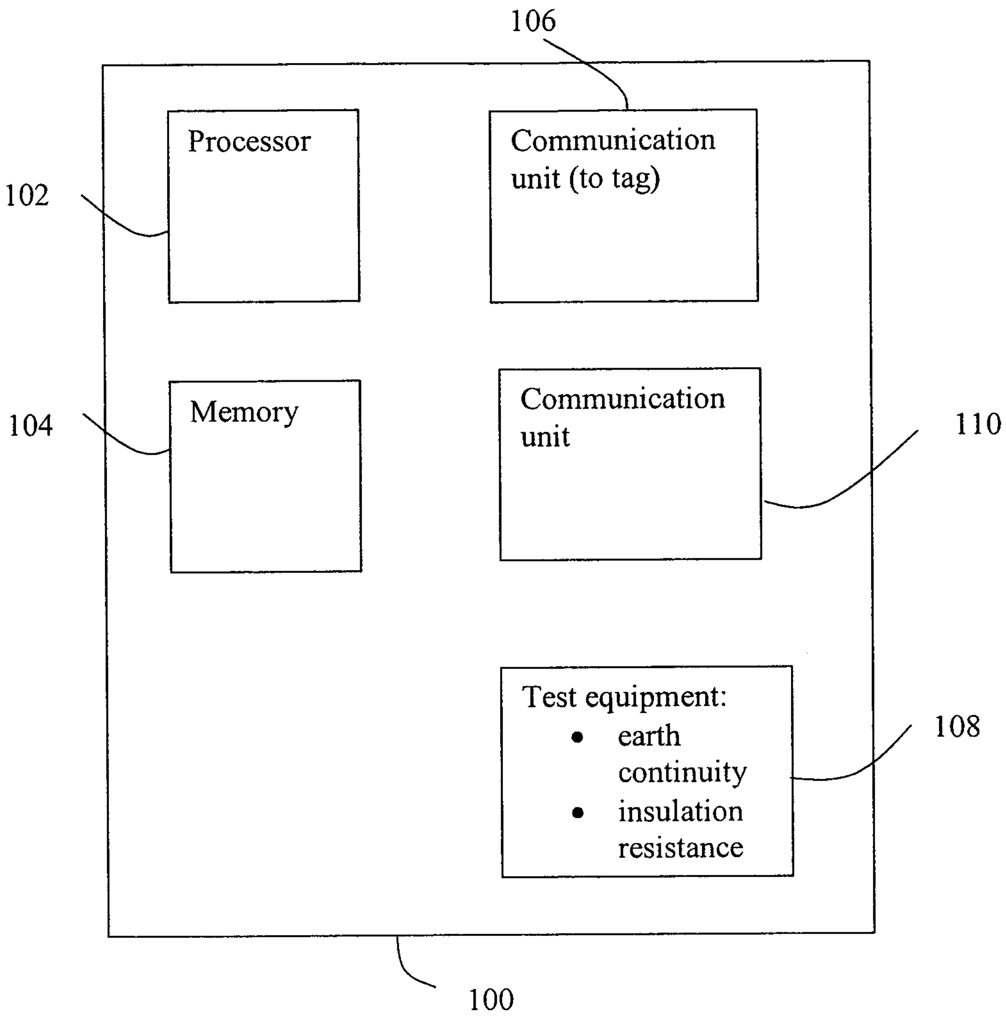
FIG. 6 is a schematic block diagram of a combined test and tag machine for use in conjunction with the electronic tags.

As shown in FIG. 6, an integrated test and tag machine 100 may be used to service the leads to which the electronic tags 8, 9 or 200 are attached. The test and tag machine 100 may include some or all of the equipment used to perform the tests on the electrical leads as required by occupational health and safety (OHS) procedures. The test equipment 108 may, for example, include tests for earth continuity and insulation resistance. The integrated test and tag machine 100 also includes a communication unit 106 to enable communication with the electronic tag 8, 9, 200. The communication unit 106 may use RF communication. In other implementations, other methods of communication such as a serial link may be used.

The machine 100 may also include a communication unit 110 to enable communication with an external device such as a computer. The unit 110 may include a data connection via the USB, IEEE1394, or Ethernet protocols, or by other similar technologies. However various communication methods may be used to exchange data with the external device, including a wired serial link or wireless connection. Test results of tests performed using machine 100 may be output from the machine 100 and stored externally.

The machine 100 also includes a processing unit 102 and a memory 104. The integrated machine 100 may thus be used to perform the required testing on the electrical leads. After or during the tests, the test results may be transferred to the electronic tag 8, 9, 200 by the communication unit 106. The test results are also stored in memory 104, from where they may be downloaded via communication unit 110 to an external database. During communication with the electronic tag 8, 9, the integrated machine 100 may also download earlier test results from the electronic tag 8, 9. The transferred information will include ID information describing the lead being tested. This ID information may also be used in tracking and inventory control of the leads.

Further Arrangement: Storing Test Results Only

In a further arrangement, the electronic tag includes only the data storage 2, and omits the data processing unit 3, display 4, speakers 6 and button 5. Due to the reduced power usage, the battery 1 is no longer required. The data storage 2 is used to store test history data. The most recent test information, including the name of the tester or testing company, the date of the test and the expiry date will be written or printed onto a tag at the time of testing. The written or printed tag is attached to the lead along with the electronic tag. This arrangement is similar to current tagging implementations, with the additional benefit of the complete testing history being stored within the data storage 2 of the electronic tag. The electronic tag is re-useable, and may incorporate a bar code or other identifying code for correlation to an external database.

Coloured Tags

The electronic tags described herein may be colour coded to provide additional visual information. This may take a form of a coloured single-use jacket for an electronic tag, or a removable coloured insert locatable in a housing such as housing 12. In some arrangements this coloured tag may have test results manually written or printed thereon. Alternatively, even if the coloured jacket or insert does not contain any written or printed information, the colour of the jacket/insert provides a visual indication of the maintenance status of the leaders. The colour information thus complements and reinforces the maintenance status displayed on the display 4. Colour information may also or alternatively be provided by use of a multicoloured LED.

It will be understood that the invention disclosed and defined in this specification extends to all alternative combinations of two or more of the individual features mentioned or evident from the text or drawings. All of these different combinations constitute various alternative aspects of the invention.

The electronic tags described herein may encourage environmentally responsible practice. Currently, many electrical leads end up in landfill because people do not see the value in the leads, particularly when many new electrical products are shipped with new leads. When properly maintained and cared for, electrical leads can last many years without needing replacement.

The electronic tags described herein encourage users to keep track of and maintain their leads. The electronic tags incorporating displays 4 are visually engaging, and users may be less inclined to throw them away when new leads arrive. It is hoped that this design will encourage manufacturers to ship their electronic products with the option of not including new leads. This will increase the supplier's profitability and will limit excess plastics and metals being deposited in landfill.

It will also be understood that the term "comprises" (or its grammatical variants) as used in this specification is equivalent to the term "includes" and should not be taken as excluding the presence of other elements or features.

The claims defining the invention are as follows:

1. An electronic tag for displaying a maintenance state of an associated electrically-powered device, the tag comprising:

- data storage storing data indicative of the maintenance state, the data comprising information defining an expiry date for the maintenance state;
- a data processing unit that, in use, monitors a remaining duration to the expiry date;
- a display that displays information indicative of the maintenance state; and
- a cut-out unit that controllably enables and disables transmission of electrical power to the associated electrically powered device dependent on the remaining duration;
- wherein the cut-out unit enables transmission of electrical power if the remaining duration exceeds a specified threshold and the cut-out unit disables transmission of electrical power to the associated device if the remaining duration is less than the specified threshold; and
- an output activated by a control signal emitted if the remaining duration is in a specified range so as to indicate that the expiry date is approaching.

2. An electronic tag according to claim 1 wherein the maintenance state indicates that the associated device has been tested and the expiry date represents a date by which further testing of the device is due.

3. An electronic tag according to claim 1 wherein the cut-out unit comprises at least one relay.

4. An electronic tag according to claim 1 wherein the cut-out unit has a fail-safe operation in which transmission of electrical power to the associated device is disabled in the absence of an activating signal from the data processing unit to the cut-out unit.

5. An electronic tag according to claim 1 comprising by-pass switching that, if activated, by-passes the cut-out unit and enables transmission of electrical power to the associated device.

6. An electronic tag according to claim 1, and said output comprising an audio output emitting an audible signal if the remaining duration is less than a specified threshold.

7. An electronic tag according to claim 6 wherein the audio output selectively emits at least two different audible signals, the data processing unit selecting one of the audible signals dependent on the remaining duration.

8. An electronic tag according to claim 1 wherein said data storage has sufficient capacity to store test data obtained from scheduled testing of the associated electrically-powered device.

9. An electronic tag according to claim 1 wherein the display displays the expiry date of the maintenance state.

10. An electronic tag according to claim 1 further comprising a power source.

11. An electronic tag according to claim 1, wherein the tag comprises one or more modules, and the data storage, the data processing unit, and the display are distributed between different modules.

12. An electronic tag according to claim 11, wherein the data storage means is located in a tag unit, and the data processing means is located in a tag controller.

13. An electronic tag according to claim 12 wherein a plurality of tag units communicate with the tag controller.

14. An electronic tag according to claim 12, wherein the tag controller is incorporated into a power board configured for insertion into an electrical outlet.

15. A plug configured for insertion into an electrical outlet, the plug comprising an electronic tag according to claim 1.

16. A plug according to claim 15, further comprising sockets, wherein pressing pins of a testing unit into the sockets bypasses the electronic tag.

17. A plug configured for insertion into an electrical outlet, the plug comprising an electronic tag for displaying a maintenance state of the plug, wherein the electronic tag comprises:

- data storage storing data indicative of the maintenance state, the data comprising information defining an expiry date for the maintenance state;
- a data processing unit that, in use, monitors a remaining duration to the expiry date;
- a display that displays information indicative of the maintenance state; and
- a cut-out unit that controllably enables and disables transmission of electrical power via the plug dependent on the remaining duration, wherein the cut-out unit enables transmission of electrical power if the remaining duration exceeds a specified threshold and the cut-out unit disables transmission of electrical power via the plug if the remaining duration is less than the specified threshold; and
- an output activated by a control signal emitted if the remaining duration is in a specified range so as to indicate that the expiry date is approaching.

18. An electrical lead comprising:

- an electronic tag according to claim 1 operable to store and display the maintenance state of the electrical lead.

19. An electrical lead according to claim 18 wherein removing the electronic tag from the lead causes the electronic tag to be disabled.

20. An electrical lead comprising an electronic tag for displaying a maintenance state of the electrical lead, wherein the electronic tag comprises:

- data storage storing data indicative of the maintenance state, the data comprising information defining an expiry date for the maintenance state;

a data processing unit that, in use, monitors a remaining duration to the expiry date;

a display that displays information indicative of the maintenance state; and a cut-out unit that controllably enables and disables transmission of electrical power via the lead dependent on the remaining duration, wherein the cut-out unit enables transmission of electrical power if the remaining duration exceeds a specified threshold and the cut-out unit disables transmission of electrical power via the lead if the remaining duration is less than the specified threshold; and an output activated by a control signal emitted if the remaining duration is in a specified range so as to indicate that the expiry date is approaching.

21. An electrical appliance comprising an electronic tag according to claim 1 operable to store and display the maintenance state of the electrical appliance.

22. A method of monitoring a maintenance state of an electrically-powered device on an electronic tag associated with the device, the method comprising:

storing data on the electronic tag indicating that the electrically-powered device has been successfully tested and defining an expiry date for the maintenance state;

monitoring a remaining duration to the expiry date;

displaying information indicative of the maintenance state;

enabling transmission of electrical power to the device if the remaining duration exceeds a specified value; and disabling transmission of electrical power to the device if the remaining duration is less than the specified value; and emitting a control signal if the remaining duration is in a specified range, wherein the control signal activates an output so as to indicate that the expiry date is approaching.

23. A method according to claim 22 comprising altering at least one characteristic of the output dependent on the remaining duration.

24. A non-transitory computer program data storage device having program code recorded thereon operable to effect the method of claim 22.

25. The invention according to claim 1 wherein the cut-out unit again enables transmission of electrical power to the associated device when the data indicative of the maintenance state is modified to define a second expiry date for the maintenance state later than the first expiry date.

26. The invention according to claim 17 wherein the cut-out unit again enables transmission of electrical power via the plug when the data indicative of the maintenance state is modified to define a second expiry date for the maintenance state later than the first expiry date.

27. The invention according to claim 20 wherein the cut-out unit again enables transmission of electrical power via the lead when the data indicative of the maintenance state is modified to define a second expiry date for the maintenance state later than the first expiry date.

28. The invention according to claim 22 and further comprising again enabling transmission of electrical power to the device when the data indicative of the maintenance state is modified to define a second expiry date for the maintenance state later than the first expiry date.

* * * * *